United States Patent
Baskaran et al.

(10) Patent No.: US 8,244,873 B2
(45) Date of Patent: *Aug. 14, 2012

(54) METHOD, SYSTEM AND COMPUTER PROGRAM PRODUCT FOR SERVER SELECTION, APPLICATION PLACEMENT AND CONSOLIDATION PLANNING OF INFORMATION TECHNOLOGY SYSTEMS

(75) Inventors: Ramesh Baskaran, Chennai (IN); Sameep Mehta, New Delhi (IN); Anindya Neogi, New Delhi (IN); Vinayaka D. Pandit, New Delhi (IN); Gyana Ranjan Parija, Haryana (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,939

(22) Filed: Mar. 7, 2011

(65) Prior Publication Data

US 2011/0161470 A1   Jun. 30, 2011

Related U.S. Application Data

(63) Continuation of application No. 12/217,439, filed on Jul. 3, 2008, now Pat. No. 7,970,905.

(51) Int. Cl.
    *G06F 15/16* (2006.01)
(52) U.S. Cl. ........ 709/226; 709/709; 709/224; 709/223; 718/105
(58) Field of Classification Search .................. 709/226, 709/223–224; 718/105
    See application file for complete search history.

(56) References Cited

U.S. PATENT DOCUMENTS

5,737,623 A * 4/1998 Liebrock .................. 712/13
(Continued)

FOREIGN PATENT DOCUMENTS

WO   WO 2004/012038   2/2004

OTHER PUBLICATIONS

Bin packing problem, http://en.wikipedia.org/wiki/Bin_packing_problem, printed Jun. 16, 2008.

(Continued)

*Primary Examiner* — Alina N. Boutah
(74) *Attorney, Agent, or Firm* — Ryan, Mason & Lewis, LLP

(57) ABSTRACT

A plurality of application profiles are obtained, for a plurality of applications. Each of the profiles specifies a list of resources, and requirements for each of the resources, associated with a corresponding one of the applications. Specification of a plurality of constraints associated with the applications is facilitated, as is obtaining a plurality of cost models associated with at least two different kinds of servers on which the applications are to run. A recommended server configuration is generated for running the applications, by formulating and solving a bin packing problem. Each of the at least two different kinds of servers is treated as a bin of a different size, based on its capacity, and has an acquisition cost associated therewith. The size is substantially equal to a corresponding one of the resource requirement as given by a corresponding one of the application profiles. Each of the applications is treated as an item, with an associated size, to be packed into the bins. The bin packing problem develops the recommended server configuration based on reducing a total acquisition cost while satisfying the constraints and the sizes of the applications.

23 Claims, 7 Drawing Sheets

U.S. PATENT DOCUMENTS

| | | | |
|---|---|---|---|
| 6,272,483 | B1 | 8/2001 | Joslin et al. |
| 6,278,901 | B1 | 8/2001 | Winner et al. |
| 6,795,399 | B1 | 9/2004 | Benmohamed et al. |
| 6,877,035 | B2 | 4/2005 | Shahabuddin et al. |
| 7,187,652 | B2 | 3/2007 | Lee et al. |
| 7,305,520 | B2 | 12/2007 | Voigt et al. |
| 7,437,614 | B2 * | 10/2008 | Haswell et al. ............. 714/38.13 |
| 7,594,016 | B1 | 9/2009 | Zhou et al. |
| 7,640,342 | B1 * | 12/2009 | Aharoni et al. ............... 709/226 |
| 7,644,148 | B2 | 1/2010 | Ranganathan et al. |
| 7,669,029 | B1 | 2/2010 | Mishra et al. |
| 7,873,549 | B1 * | 1/2011 | Mishra et al. ................... 705/28 |
| 2002/0143929 | A1 | 10/2002 | Maltz et al. |
| 2002/0143945 | A1 | 10/2002 | Shahabuddin et al. |
| 2003/0005028 | A1 | 1/2003 | Dritschler et al. |
| 2003/0065758 | A1 | 4/2003 | O'Sullivan et al. |
| 2003/0118027 | A1 | 6/2003 | Lee et al. |
| 2003/0154282 | A1 | 8/2003 | Horvitz |
| 2003/0191829 | A1 * | 10/2003 | Masters et al. ............... 709/223 |
| 2003/0191996 | A1 | 10/2003 | Mukherjee et al. |
| 2003/0225904 | A1 | 12/2003 | Kanno et al. |
| 2004/0139186 | A1 * | 7/2004 | Lee et al. ..................... 709/223 |
| 2005/0138170 | A1 | 6/2005 | Cherkasova et al. |
| 2006/0020366 | A1 | 1/2006 | Bloom |
| 2006/0080285 | A1 | 4/2006 | Chowdhuri |
| 2006/0107087 | A1 | 5/2006 | Sieroka et al. |
| 2007/0192406 | A1 | 8/2007 | Frietsch et al. |
| 2007/0255830 | A1 * | 11/2007 | Alt et al. ...................... 709/226 |
| 2007/0271570 | A1 * | 11/2007 | Brown et al. ................. 718/105 |
| 2008/0059630 | A1 * | 3/2008 | Sattler et al. .................. 709/224 |
| 2008/0059972 | A1 * | 3/2008 | Ding et al. .................... 718/105 |
| 2008/0062886 | A1 | 3/2008 | Tang et al. |
| 2008/0091826 | A1 | 4/2008 | Dias et al. |
| 2008/0189418 | A1 | 8/2008 | Kimbrel et al. |
| 2008/0209043 | A1 | 8/2008 | Ajiro |
| 2008/0215179 | A1 | 9/2008 | Yair et al. |
| 2008/0216088 | A1 | 9/2008 | Tantawi et al. |
| 2009/0070771 | A1 * | 3/2009 | Yuyitung et al. ............. 718/105 |
| 2009/0254660 | A1 * | 10/2009 | Hanson et al. ................ 709/226 |
| 2009/0287823 | A1 | 11/2009 | Bose et al. |

OTHER PUBLICATIONS

Li et al. Bin-Packing Problem with Concave of Bin Utilization, Wiley InterScience, Mar. 9, 2006, 11 pages.

Pisinger et al. The Two-Dimensional Bin Packing Problem with Variable Bin Sizes and Costs, Science Direct, Jan. 14, 2005, 14 pages.

Bein et al. A Fast Asymptotic Approximation Scheme for Bin Packing with Rejection, printed 2010.

Bettinelli et al. A Branch-and-price Algorithm for the Variable Size Bin Packaging Problem with Minimum Filling Constraint, Springer Science+Business Media, LLC 2008, 21 pages.

Anily et al. Worst-Case Analysis of Heuristics for the Bin Packing Problem with General Cost Structures, INFORMS, 1994.

Srikantaiah et al. Energy Aware Consolidation for Cloud Computing, printed Jun. 20, 2010, 9 pages.

* cited by examiner

FIG. 2

| OPTIMIZING PURCHASE COST + DYNAMIC COST | | |
|---|---|---|
| PLANS GENERATED BY SSP (RANKED BASED ON INITIAL COST) | | |
| PLATFORM | PRICE/UNIT | #UNITS |
| 1. P5-510 | $5000 | 4 |
| 2. IBM HS-21 BLADECENTER | $4500 | 4 |
| 3. X3650 | $3000 | 8 |
| PLANS SORTED BY DSC BASED ON RUNTIME COST | | |
| PLATFORM | NUMBER OF UNITS | |
| 1. X3650 | 7* | |
| 2. HS-21 BLADECENTER | 3* | |
| 3. P5-510 | 4 | |
| RECOMMENDED PLAN HS-21 BLADECENTER | 3~ | |

X3650 HAS LEAST RUNTIME COST BECAUSE OF BETTER POWER MANAGEMENT
(POWER CAPPING SUPPORT ALONG WITH POWERSAVER)
HS-21 SUPPORTS POWERSAVER BUT NO POWER CAPPING SUPPORT.

(*) NUMBER OF UNITS ARE REDUCED DUE TO RUNTIME CONSOLIDATION USING VMOTION
(~) HS-21 HAS THE BEST STATIC + RUNTIME COST FOR THE GIVEN WORKLOAD.

(SERVER 1, COST 1, CAP 1)     (SERVER 2, COST 2, CAP 2)

FIG. 6

| | A | | B | C | D | E |
|---|---|---|---|---|---|---|
| | PartitionName | | PartitionInstance | SAPs | ServerNo | ServSite |
| 2 | ProductionAPO_Combined | 602 | 1 | #### | 0 | 1 |
| 3 | ProductionBW_DB | 602 | 1 | #### | 0 | 1 |
| 4 | ProductionAPO_Combined_FO | 602 | 1 | #### | 1 | 1 |
| 5 | ProductionERP_DB | 602 | 1 | #### | 1 | 1 |
| 6 | ProductionBW_DB_FO | 602 | 1 | 4756 | 1 | 1 |
| 7 | ProductionBW_APP_servers | 602 | 1 | #### | 100 | 1 |
| 8 | ProductionERP_DB_FO | 602 | 1 | #### | 101 | 1 |
| 9 | Administrative_serversAPO_Shadow_server | 602 | 1 | 7125 | 101 | 1 |
| 10 | ProductionMDM | 602 | 2 | #### | 102 | 1 |
| 11 | Administrative_serversAPO_Shadow_server | 602 | 1 | 6904 | 102 | 1 |
| 12 | ProductionTSM | 602 | 1 | #### | 103 | 1 |
| 13 | ProductionXI | 602 | 1 | #### | 103 | 1 |
| 14 | ProductionSolution_Manager | 602 | 1 | 7500 | 104 | 1 |
| 15 | DevelopmentSolution_Manager | 602 | 2 | 6904 | 104 | 1 |
| 16 | ProductionTSM | 602 | 3 | 6904 | 104 | 1 |
| 17 | ProductionTSM | 602 | 4 | 6904 | 105 | 1 |
| 18 | ProductionTSM | 602 | | | | |

METHOD, SYSTEM AND COMPUTER PROGRAM PRODUCT FOR SERVER SELECTION, APPLICATION PLACEMENT AND CONSOLIDATION PLANNING OF INFORMATION TECHNOLOGY SYSTEMS

CROSS-REFERENCE TO RELATED APPLICATIONS

This application is a continuation of U.S. patent application Ser. No. 12/217,439 filed Jul. 3, 2008, the complete disclosure of which is expressly incorporated by reference herein in its entirety for all purposes.

FIELD OF THE INVENTION

The present invention relates to the electrical, electronic and computer arts, and, more particularly, to planning of information technology (IT) systems and the like.

BACKGROUND OF THE INVENTION

A number of different problems are typically encountered in hosting enterprise-wide IT. These problems include presence of multiple applications, heterogeneous servers, non-uniform utilization across servers, and complex service level agreement (SLA) and quality-of-service (QoS) requirements. Several different approaches have been proposed to address these issues.

US Patent Publication 2003-0225904 discloses a server load distribution apparatus, server load distribution program and server system. A server load distribution apparatus provided between a client and servers including a first power supply and a control unit activating the first power supply depending on a command, comprises a unit for receiving a data request packet from one of the client computers, a unit for transferring the received data request packet to the one of the servers, a unit for counting the number of responses per unit of time, the responses being responses of the servers to the data request packet, a unit for determining an optimal number of the servers which are in operation based on the data request packet and the number of the responses, and instruct the transfer unit to transfer the data request packet to one of the servers, and a unit for supply a plurality of commands for activating the first power supply to the control units.

US Patent Publication 2003-0005028 discloses a system and method for determining how many servers of at least one server configuration to be included at a service provider's site for supporting an expected workload. A method comprises receiving, into a capacity planning system, workload information representing an expected workload of client accesses of streaming media files from a site. The method further comprises the capacity planning system determining, for at least one server configuration, how many servers of the at least one server configuration to be included at the site for supporting the expected workload in a desired manner.

US Patent Publication 2005-0138170 discloses a method and apparatus for controlling the number of servers in a hierarchical resource environment. The invention relates to the control of servers which process client work requests in a computer system on the basis of resource consumption. Each server contains multiple server instances (also called "execution units") which execute different client work requests in parallel. A workload manager determines the total number of server containers and server instances in order to achieve the goals of the work requests. The number of server instances started in each server container depends on the resource consumption of the server instances in each container and on the resource constraints, service goals and service goal achievements of the work units to be executed. At predetermined intervals during the execution of the work units the server instances are sampled to check whether they are active or inactive. Dependent on the number of active server instances the number of server address spaces and server instances is repeatedly adjusted to achieve an improved utilization of the available virtual storage and an optimization of the system performance in the execution of the application programs.

WIPO Publication WO/2004/012038 discloses near on-line servers. A dynamic state manager (DSM) for a server cloud manager (SCM) of a virtualized logical server cloud includes a resource definition, a rules module and a state manager engine. The resource definition incorporates information of the available physical and logical resources of the server cloud, including cost, priority, usage and demand information of the resources. The resource definition further incorporates dependencies and relationships between physical and logical resources. The rules module includes predetermined behavioral rules based on demand, usage, priority and cost information. The behavioral rules define optimized resource utilization of the resources of the server cloud. The state manager engine is linked to the resource definition and the rules module and cooperates with the SCM to apply the behavioral rules to achieve optimized resource utilization.

SUMMARY OF THE INVENTION

Principles of the present invention provide techniques for server selection, application placement and consolidation. In one aspect, an exemplary method (which can be computer implemented) includes the step of obtaining a plurality of application profiles, for a plurality of applications. Each of the profiles specifies a list of resources, and requirements for each of the resources, associated with a corresponding one of the applications. Additional steps include facilitating specification of a plurality of constraints associated with the applications; facilitating obtaining a plurality of cost models associated with at least two different kinds of servers on which the applications are to run; and generating a recommended server configuration for running the applications, by formulating and solving a bin packing problem. Each of the at least two different kinds of servers is treated as a bin of a different size, based on its capacity, and has an acquisition cost associated therewith. The size is substantially equal to a corresponding one of the resource requirement as given by a corresponding one of the application profiles. In one or more embodiments, capacity is expressed in the same units as the units for the resources that specify the application profile. Each of the applications is treated as an item, with an associated size, to be packed into the bins. The bin packing problem develops the recommended server configuration based on reducing a total acquisition cost while satisfying the constraints and the sizes of the applications.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system/apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 2 shows an example of optimizing purchase cost and dynamic cost;

FIG. 6 is a screenshot of an exemplary yearly assignment, in the form of a spreadsheet.

DETAILED DESCRIPTION OF PREFERRED EMBODIMENTS

Figure 1:
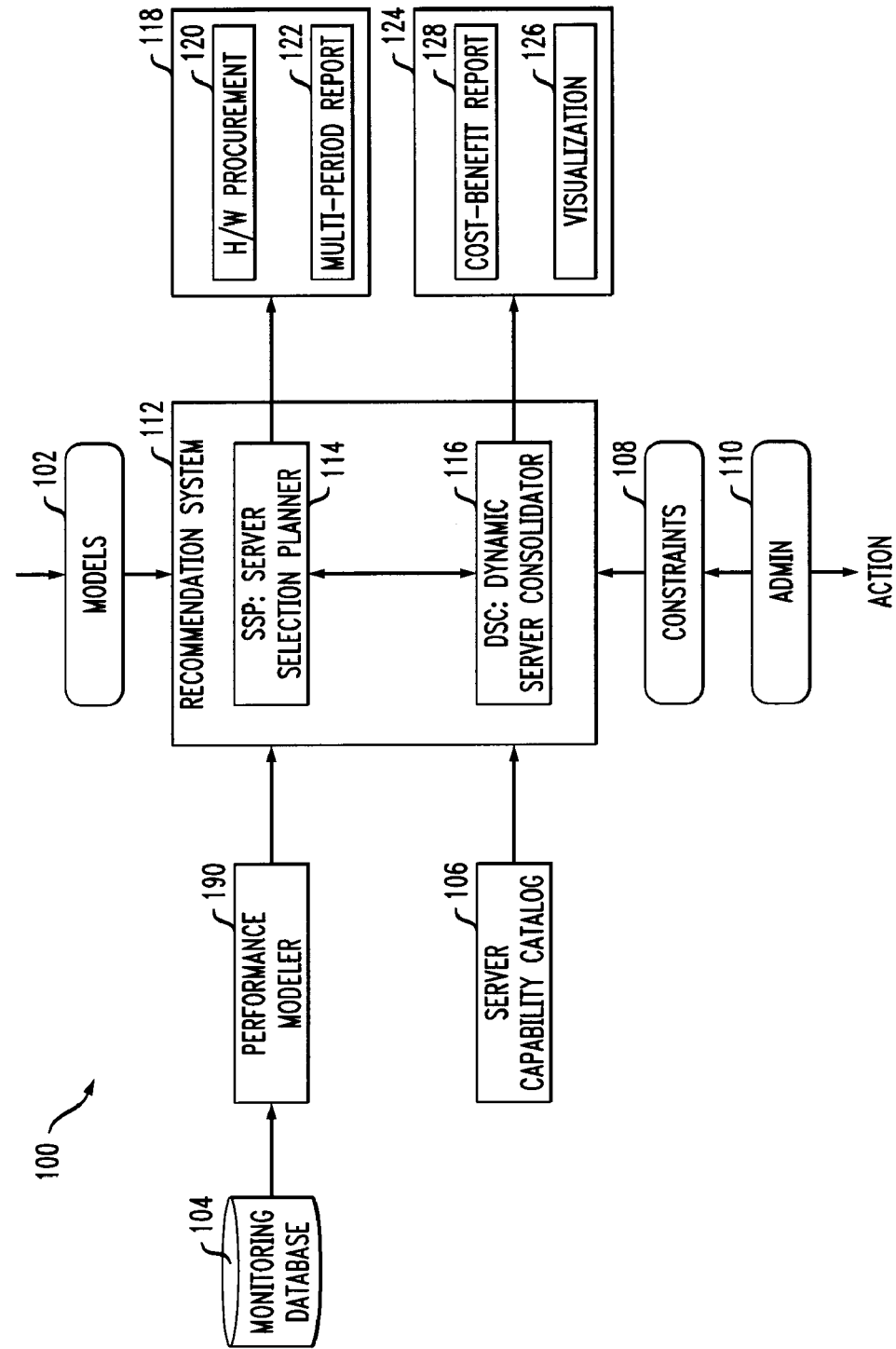
FIG. 1 shows an exemplary embodiment of a system, according to an aspect of the invention.

Aspects of the invention address static and dynamic consolidation planning of IT systems and the like, and provide systems, methods, and computer program products for server selection at the planning stage, taking into consideration: growth in requirements for multiple years, multiple server options, and growth in technology during the planning horizon; application placement for reducing or even minimizing run-time cost; server consolidation during the production stage, taking into account workload characteristics, SLA and/or QoS metrics, power management issues, and the like; and/or translation of operational constraints (for example, constraints associated with an enterprise) into their equivalent mathematical representations.

In one or more instances, collect monitoring data from a data center environment over some period; for example, data such as central processing unit (CPU), network, disk, and memory utilization. Infer application profiles from the collected data, for example, SAP Ratings of SAP modules (SAP refers to, for example, SAP® R/3 enterprise resource planning software or SAP® ERP enterprise resource planning software available from SAP AG of Walldorf, Germany—registered mark). Specify (and meet) operational constraints, such as those associated with an enterprise; these may include, for example, fault tolerance properties; mutual exclusivity of applications on servers, and the need to respect packing constraints imposed by the infrastructure capacity. Specify cost models, such as hardware cost, fixed overheads (such as turning on a server), and/or dynamic costs, such as power cost, live migration cost, and the like. Generate reports and recommendations to reduce or minimize overall cost, and configure and/or operate a system of interest in accordance with the reports and recommendations.

Information typically available to the system administrator includes a list of enterprise applications used; system- and application-level monitored data; projected growth in the infrastructural requirements year-to-year; multiple hardware options and their year-to-year technology growth; and performance, power, and/or virtual machine migration models.

Goals of the system administrator typically include provisioning sufficient hardware, of minimum cost, to host the entire IT infrastructure; planning for multiple years; cost and power effective management of the infrastructure during the production stage, exploiting virtualization capabilities; and respect for substantially all operational and enterprise constraints, substantially all the time.

A typical problem definition includes application placement to reduce, or even minimize, cost. Costs to be reduced or minimized include the purchase cost of hardware (server selection planning (SSP)), as well as operational costs (dynamic server consolidation (DSC)). The cost reduction or minimization takes into account (wherever available), one or more of fault tolerance constraints, load balancing across multiple sites, SLA, QoS, and other legal (for example, contractual) requirements, and packing constraints. These items can be taken into account by analyzing and/or using application profiles (benchmark ratings), a server catalog, and/or performance and cost models.

FIG. 1 depicts an overall view 100 of an exemplary system, according to an aspect of the invention. Exemplary inputs into recommendation system 112 may include, for example, models 102, obtained by benchmarking and/or analytical techniques; a monitoring database 104, with results of system monitoring therein; a server capability catalog 106; and one or more constraints 108, which may be obtained, for example, from the system administrator 110. System 112 may include, for example, a server selection planning module 114, which analyzes the inputs to produce reports and recommendations 118; these may include, for example, hardware procurement recommendations 120 and/or a multi-period report 122. System 112 may also include, for example, a dynamic server consolidator 116, which analyzes the inputs to produce text and or visual reports 124, such as cost benefit report 128 and/or visualization with an appropriate graphical user interface (GUI)(block 126). System administrator 110 takes one or more actions based on the output of system 112; for example, designing an IT system, operating an IT system, configuring an IT system and/or re-configuring an IT system. The reports (text or graphical) and recommendations 118, 124 of system 112 thus provide useful, concrete and tangible results enabling the action by administrator 110.

A number of non-limiting exemplary scenarios, illustrating use of system 112, will now be presented. In some instances, when application profiles are pre-existing and SSP 114 is used in isolation, the catalog of application profiles, catalog of hardware options, and estimates of growth are used to recommend a minimum cost server combination for hosting the infrastructure. In other instances, when application profiles are created from monitored data, but SSP 112 and DSC 116 are decoupled, monitored system and application level data is used by a performance modeler 190 to infer application profiles, while the SSP is used to recommend a minimum cost server combination for hosting the infrastructure from the inferred profiles, combined with the catalog of hardware options and estimates of growth. Performance modeler 190 takes as an input monitored data on a given server platform and uses it to build an application profile for the application. This covers the case where application profiles are not already available. In still other instances, SSP 114 is used in combination with DSC 116 to reduce or even optimize (minimize) fixed cost plus runtime cost. In this latter case, SSP 112 computes a set of low-cost, feasible server combinations from the above data; for each such option, its runtime cost is estimated from the performance models and application profiles, and the combination for which the total of fixed cost and runtime cost is minimum is chosen.

Note that in some instances, one or more servers experience peaks and troughs of CPU utilization which are somewhat out-of-phase with those of one or more other servers. Dynamic server consolidation techniques, according to aspects of the invention, advantageously automatically handle such complementary virtual machines (and/or low-utilization virtual machines).

FIG. 2 shows a non-limiting example of an aspect of the invention. Plans generated by SSP 114 are ranked based on initial cost, while plans are sorted by the DSC 116 based on runtime cost. In this non-limiting example, "x3650" has the least runtime cost because of better power management (for example, IBM PowerExecutive™ Power Capping support (mark of International Business Machines Corporation ("IBM"), Armonk, N.Y., USA) along with demand based switching (DBS) power management technology), while HS-21 supports DBS but has no Power Capping support. P5-510, HS-21 blade center, and X3650 are server platforms available from IBM. Power Capping and DBS are techniques available on some server platforms that help in better power management. VMotion is a server virtualization technology available from VMware, Inc., Palo Alto, Calif. 94304, USA.

As an example, designate all software applications $A_i$, i=1 to n, and predict the size and list of resources required year-by-year. Consider servers 1 to n, including their cost, $Cost_n$, as well as capacity of the $n^{th}$ server, CAPn. Select servers of minimum cost and pack all the applications, while meeting all constraints. Note, assume n servers and applications, but some servers might be empty after consolidation planning.

Figure 3:
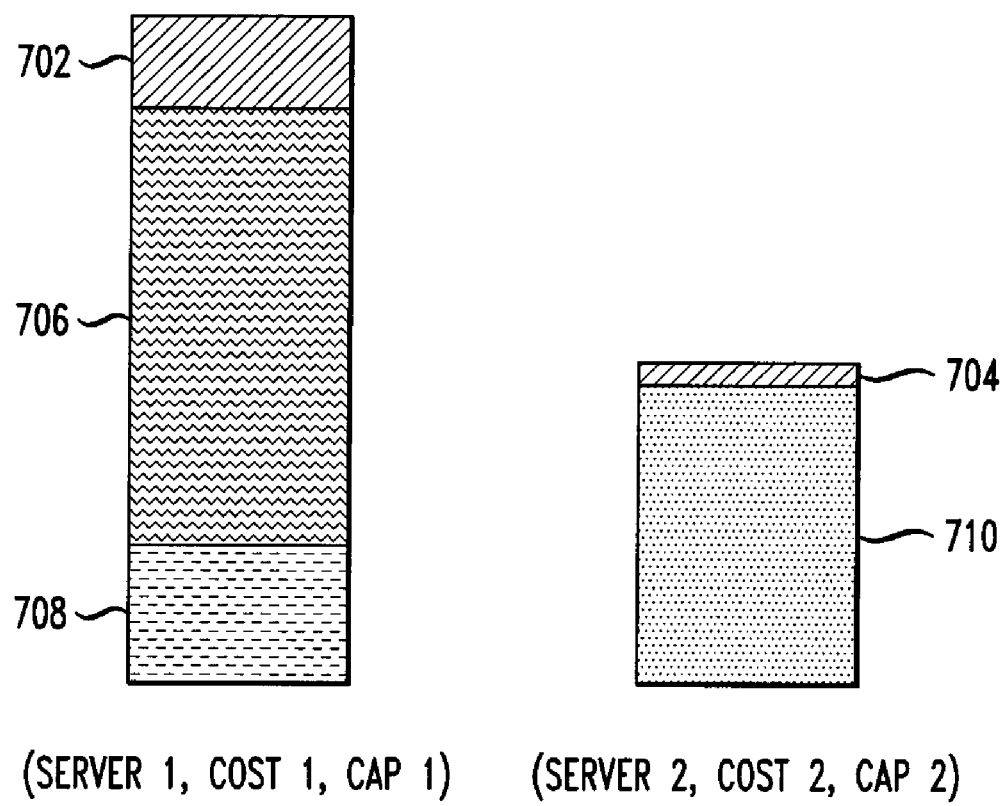
FIG. 3 shows an example of two different servers with two different costs and two different capacities.

FIG. 3 shows two servers 702, 704, with costs $Cost_1$ and $Cost_2$ and capacities $CAP_1$ and $CAP_2$. Also shown are three applications, 706, 708, 710 distributed over the three servers. In one or more embodiments of the invention, formulate the problem as a generalized bin-packing problem. The servers 702, 704 are represented as bins of different sizes and costs. Applications 706, 708, 710 are items with their sizes. NIC (network interface card) and boot constraints are imposed as cardinality constraints (that is, constraints specifying restrictions on maximum allowed value). One or more embodiments include one or more of use of different sized bins and placing costs on bins, as well as enabling multiple year planning. In one or more embodiments, modify well known heuristics such as first fit (FF), next fit (NF), and best fit (BF) in the decreasing order of items. In one or more embodiments, retain what is needed and prune as needed. For example, consider the FF heuristic. This involves considering the applications in the decreasing order of their sizes. This can be achieved by first sorting the applications in the decreasing order of their sizes. Furthermore, the servers are numbered according to the order in which they are decided to be acquired. Now, when each application is considered, it is put into the earliest acquired server into which it fits. If it does not fit into any of the acquired servers, a decision is made to acquire a new server. In case of the first-fit heuristic, a server that has enough capacity to host the application at minimum cost is acquired. The decisions of which of the existing servers to choose from and which server to acquire thus depend on the heuristic employed. Impose cardinality constraints explicitly. By way of explanation, if a server cannot accommodate more than a specified number of applications, then, adhere to this restriction even when there is spare capacity in it. In one or more non-limiting embodiments, year-to-year planning may, for example, be implemented in a two pronged manner: (i) try to fill-up the previous year's large servers as much as possible before provisioning new servers, and then (ii) plan up-gradation for small servers so that they can host applications for the next years.

One or more embodiments of the invention may be implemented in the form of a software tool such as tool 112. The tool may include, for example, a completely configurable library of multiple heuristics; and/or constraints specific to the client and hosting constraints of different types of servers, for example, servers of type 1 (ST1s) and servers of type 2 (ST2s). Preferably, it is possible to add, delete, and/or modify constraints for other situations in a simple text edited format.

One or more embodiments of the invention implement power management as follows. Performance and availability constraints are used to determine the size and number of VMs for each application. Compute the optimal target server utilization for each server based on its power profile. Employ incremental DFF (Decreasing First Fit) to minimize the number of bins, while not leading to large-scale migrations; in particular, use the previous packing as a starting point, fold varying server utilization in the heterogeneous bin-packing framework, and incremental versions of other packing algorithms as well (online and approximation algorithms). Greedy exploration is employed to short-circuit costly migrations and optimize the power versus migration cost tradeoff.

Consider the consolidation problem formulation. In one or more embodiments, maximize the objective function, B:

$$B = \sum_{i=1}^{N} (Cost_i + \mathcal{F}(CPU_i)) - \sum_{j=1}^{N} \left( \begin{array}{c} Cost_j \times Y_j + \sum_{k=1}^{N} MCost_{k,j} \times \\ A_{k,j} + \mathcal{F}\left(\sum_{k=1}^{N} CPU_k \times A_{k,j}\right) \end{array} \right)$$

In the equation for B:
 N is the number of VMs,
 $Cost_a$ is the fixed cost of running a server "a,"
 $MCost_{b,c}$, is the cost of migrating $VM_b$ to $server_c$,
 $\mathcal{F}(v)$ is a power function dependant on CPU utilization, as explained further below,
 Y marks used servers (Y is used for bookkeeping to track which servers are currently being used), and
 A records the assignments (A records which applications are assigned to which server).

$\mathcal{F}(v)$ represents the power drawn by a server at a given utilization. This function is, for example, supplied by an expert, or computed experimentally in cases when the system is available. If the system is available, then the function can be computed by driving the servers at different CPU utilization levels and fitting a piece-wise linear curve between the measured points (X-axis is CPU utilization, Y-axis is power drawn).

Consider now the specification of constraints. Any recommendation to merge two or more servers should satisfy all pertinent constraints. These may include, for example, system level constraints, SLA constraints, legal constraints, application level constraints, and/or domain specific constraints. Examples of system level constraints are as follows: CPU utilization should not remain above 90% for more than 10 minutes, network traffic due to VM migration should be less than 10% of LAN capacity, keep peak power consumption of the data center less than 2000 kW. An example of an SLA constraint is that response time of an application should be less than 5 seconds. An example of a legal constraint is that some processes require hardware isolation. An example of an application level constraint is that two applications simultaneously accessing a remote database should not be hosted on the same machine. Domain specific constraints are constraints specified by domain experts based on domain specific intelligence.

Advantageously, flexibility to specify the constraints is provided by a structured and/or mathematical language powerful enough to specify constraints of the form: "Servers A & B can be merged only between 5 AM to 6 PM; after that, the servers cannot be merged with any other server." For example, this can be specified in structured language as:
If (Time>5 PM AND Time<6 PM)
  Possible-Merge$_{(A,B)}$=TRUE
Else
  Possible-Merge$_{(A,B)}$=FALSE Advantageously, visualization tools and/or textual reports are provided to assist in understanding and/or visualizing "before" and "after" scenarios of the servers recommended to be merged. This allows the system administrator 110 to visually examine the recommendations. Preferably, the system administrator 110 can also visually see the effect of implementing the recommendation on different system level parameters. Reports can be generated on possible merged configurations and the net reward or penalty for each configuration. This facilitates informed decision making.

The recommendation system 112 (also referred to as recommendation engine (RE) 112) is preferably provided in the form of an intelligent, robust and scalable backend recommendation engine, which can generate recommendations while taking into account the pertinent constraints. In one or more embodiments, the engine is capable of dynamic recommendations, for example:
A & B—Merge between 1 PM and 5 PM
A & C—Merge between 5 PM and 11 PM
B—Stand alone between 7 PM and 9 PM.

Examples of constraints include assigning each VM to exactly one server and limiting the number of violations such that it is less than a user-defined threshold. Domain expert-defined constraints may include exclusivity and time-dependent exclusivity.

In some instances, static techniques are employed for data analysis. These may be used to generate recommendations for a plurality of time periods, for example, recommendation can be generated for multiple years taking into account cost and technology changes in multiple years. This approach to the situation is posed as an optimization problem, to minimize the number of violations of the constraints. A tolerable number of violations is typically specified as part of the constraint. Recommendations are fixed and do not change over time. Advantages to this approach are that it is easy to derive recommendations, and there is less overhead for the system administrator. Another advantage is that the migration cost is only a one-time cost. However, this may not be the most effective approach, and time-varying changes are not leveraged.

Dynamic techniques are also appropriate in some cases. Such techniques generate time varying change aware recommendations. In the dynamic approach, static techniques are used to generate recommendations at a lower time resolution (that is, the static techniques are used to generate a series of "snapshots" at incremental units of time, based on updated conditions). The recommendations may be implemented (that is, servers recommended for combination may be combined) if the savings are greater than the migration cost. This approach tends to be more effective than the static approach, and the real power is exposed if the majority of systems are complementary. In some cases, however, migration costs may be high, and more involvement of the system administrator is typically required to approve recommendations.

A number of evaluation criteria may be used to determine the effectiveness of one or more inventive approaches; for example, the total number of servers turned off; the number of violations of constraints per unit time; the time taken to generate recommendations; and, for dynamic mapping only, the remapping interval (the incremental units of time mentioned above). It is good to have a high interval to show stability, but not too high, because that would mean that either the workload is static or the dynamism is not being exploited.

Figure 4:
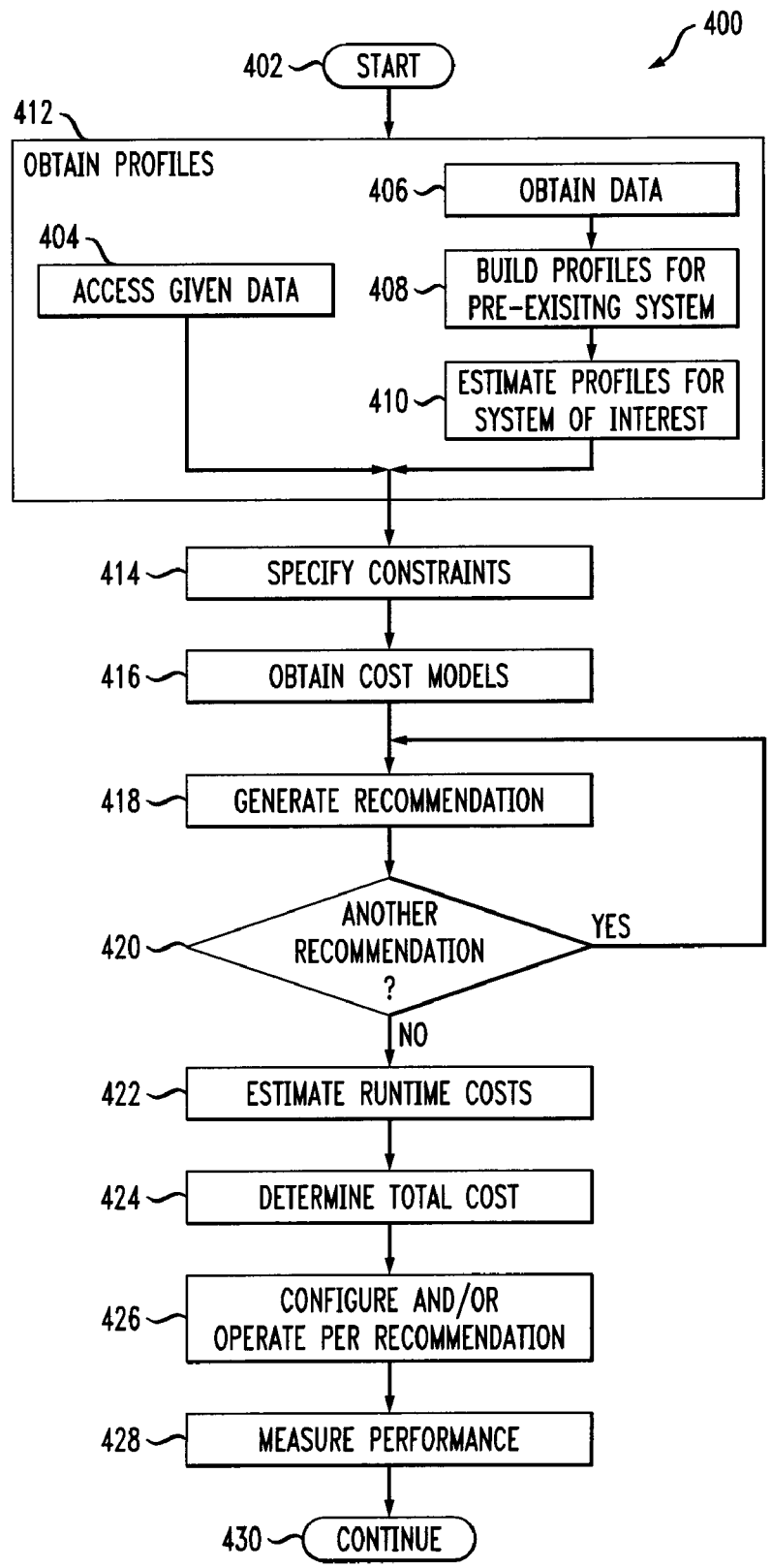
FIG. 4 is a flow chart of exemplary method steps, according to another aspect of the invention.

Attention should now be given to FIG. 4, which presents a flow chart 400 of exemplary method steps. After beginning at block 402, step 412 includes obtaining a plurality of application profiles, for a plurality of applications. Each of the profiles specifies a list of resources, and requirements for each of the resources, associated with a corresponding one of the applications. Step 414 includes facilitating specification of a plurality of constraints associated with the applications. Step 416 includes facilitating obtaining a plurality of cost models associated with at least two different kinds of servers on which the applications are to run. Step 418 includes generating a recommended server configuration for running the applications, by formulating and solving a bin packing problem.

Each of the at least two different kinds of servers is treated as a bin of a different size, based on its capacity, and has an acquisition cost associated therewith. The size is substantially equal (that is, exactly equal, or close enough to permit useful predictions) to a corresponding one of the resource requirements as given by a corresponding one of the application profiles. Capacity is typically in the same units as the units for the resources that specify the application profile. Each of the applications is treated as an item, with an associated size, to be packed into the bins. The bin packing problem develops the recommended server configuration based on reducing the total acquisition cost while satisfying the constraints and the sizes of the applications.

Optionally, an additional step 426 includes configuring the applications and the servers in accordance with the recommended server configuration and/operating the applications and the servers in accordance with the recommended server configuration.

In some instances, the step 412 of obtaining the plurality of application profiles comprises accessing given data, as per block 404. In another approach, the step 412 of obtaining the plurality of application profiles includes step 406, obtaining monitored data from at least one pre-existing system on which the applications are already running; step 408, using the data from the at least one pre-existing system to build pre-existing system application profiles for the pre-existing system; and step 410, using the capacities of the servers to estimate the plurality of application profiles.

Thus, by way of summary and review, as far as application profiles are considered, in a first exemplary scenario, assume that application profiles are already given for specific server platforms. This is indeed true for many common applications. In a second exemplary scenario, assume that monitored data is available on a system that the applications are already deployed. Use that data to build application profiles on the earlier system, and use the server capacity information to estimate the application profiles on a new target system, where it is intended to now host the applications (the target system that is the output of the SSP).

In some cases, the monitored data from the at least one pre-existing system includes central processing unit utilization, network utilization, disk utilization, and/or memory utilization.

In another aspect, the application profiles specify size and a list of resources for multiple years. There are instances in which the application profiles are already available according to some industrial standards. For example, in the domain of SAP applications, each application is characterized by what is called SAP rating, which is a normalized measure of the amount of computing power that an application needs. The SAP rating of an application is independent of the target architecture. Apart from the computational requirement, a SAP application is also characterized by the number of I/O ports it requires, number of network ports it requires and so on. Industry standard profilers are used to arrive at such a characterization and are used by the architects in designing their solution.

Thus, in some instances, the application profiles obtained in step 412 are obtained for a plurality of time periods (for example, a number of years into the future). In such instances, an additional step includes repeating the generating step 418 for additional ones of the time periods (see blocks 418 and 420). Thus, in such instances the application profiles specify size and a list of resources for multiple years. The SSP could use static profiles to compute the needed configuration for each year (or other time period). As described earlier, computing the configuration for each year involves solving the bin-packing problem derived from the new applications that need to be hosted in a given year, and the servers that can be acquired to host these applications. In order to take into account the effect of future demand, note that, in one or more embodiments, it is essentially impossible to fit the set of applications exactly. Preferably, acquire the last server in such a way that, its spare capacity can be maximally used by the future applications. That is, for each choice of the last server to be acquired, check how much of it can be usefully employed in the next year.

As noted, in some cases DSC 116 is coupled to SSP 114 to reduce both fixed and runtime costs. The recommended server can be denoted as a first recommended server configuration, and generating step 418 can be repeated (YES branch of decision block 420) to generate at least a second recommended server configuration. Once all desired recommendations are generated, step 422 includes estimating run-time cost for the first and second recommended server configurations (in general, two or more configurations); and step 424 includes determining for which of the first and second recommended server configurations the total cost (acquisition cost plus run-time cost) is lower. Step 424 may include, for example, applying the objective function, B.

Another optional step includes measuring performance of the recommended server configuration, as per block 428; for example, one or more of total number of the servers turned off, number of violations of the constraints per unit time, and time required to generate the recommended configurations. As noted, in some cases, recommendations are generated dynamically, and in such cases, the performance measurements can further include a remapping interval associated with the dynamic generation.

As noted, recommended server configurations can be based, at least in part, on detection of servers with low utilization and/or servers with complementary time-varying loads.

In a case of static recommendations, the second recommended server configuration is generated statically, for a second time (say time $t_2$), which is after a first time (say, time $t_1$) for which the first recommended server configuration is generated. The second recommendation can be generated by taking into account cost and technology changes between the first and second times $t_1$ and $t_2$.

In another aspect, in a case of dynamic recommendations, the second recommended server configuration is generated dynamically, for a second time (again, say time $t_2$), which is after a first time (again, say, time $t_1$) for which the first recommended server configuration is generated. The second recommendation is generated by generating a plurality of snapshots between the first and second times $t_1$ and $t_2$, taking into account time-varying changes in resource utilization.

Figure 5:
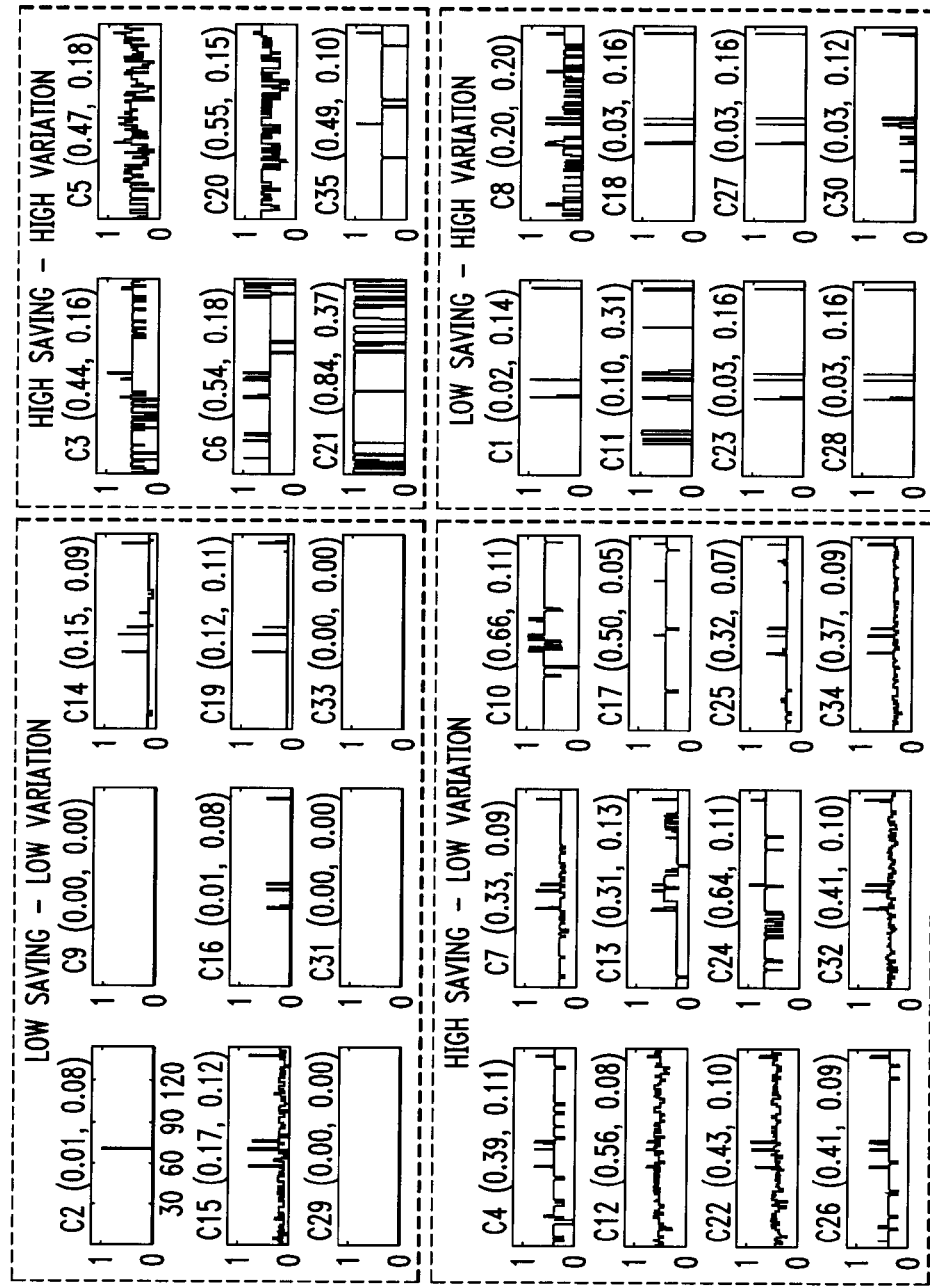
FIG. 5 presents dynamic savings per cluster, for an exemplary window of 300 minutes.

FIG. 5 shows dynamic savings per cluster for 35 clusters numbered C1 through C35, broken into groups of low saving—low variation, high saving—high variation, high saving—low variation, and low saving—high variation. Each sub plot corresponds to a cluster of servers. The y-axis in each sub plot shows the percentage of servers which can be turned off, if recommendations are taken into account. The x-axis for each sub plot ranges from 1 to 144 (300 minute periodic consolidation intervals in a month (43200 minutes)). Ideally, it is preferable to have many periods in a subplot with high fraction of servers turned off, i.e. the mean number of servers turned off across all 144 periods in the subplot to be high (high saving). It is also preferable to have the variance of this mean to be low (low variation) so that servers are not frequently turned off and on thus reducing their lifetimes.

Consider a case where a client requires, in a first year, a total of 73 logical partitions for hosting many enterprise resource planning (ERP) applications, growing, in a fourth year, to a total of 139 logical partitions for the same set of applications, with year-on-year SAP® R/3 enterprise resource planning software growth of more than 60%. The technology may include, for example, server type 1 (ST1) (16 CPUs) and several versions of server type 2 (ST2) (64 CPUs), with year-on-year SAP capacity growth of 30%. A manual solution might take at least a day to compute a single configuration, and might require roughly 25 ST1 and ST2s in the last year to host all the applications.

Using exemplary inventive techniques, near-optimal solutions may be computed within a few seconds; it is now possible to quickly respond to the client's requirement changes. As discussed below, output can be conveniently displayed, for example, in spreadsheets. One or more embodiments make the job of the architect easier, allowing the architect to innovate by specifying different constraints, exploring indigenous possibilities, and the like and seeing their impact on the solution. In the particular non-limiting example, a tool implementing inventive techniques may compute solutions which used 19 ST1s and 30 ST2s (ST1s are 6 times cheaper than ST2s); this would result in approximately 5-10% savings, which might be very significant in a $40,000,000 contract. Thus, one or more embodiments of the invention may enable significant savings in hosting platforms for multiple clients.

FIG. 6 is an example of the output generated by the SSP. It is a tab separated Excel® sheet (registered mark of Microsoft, Redmond, Wash., USA) describing the mapping computed by the planner. Each row 602 in the figure is an instance of an application. The first column 604 is the name of the application, the second column 606 specifies the copy of the application (as there could be multiple copies of the same application), the third column 608 specifies the size of the application in terms of its SAP rating, the fourth column 610 specifies the server to which it is assigned, and the fifth column 612 specifies the geographical location where the server is hosted.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
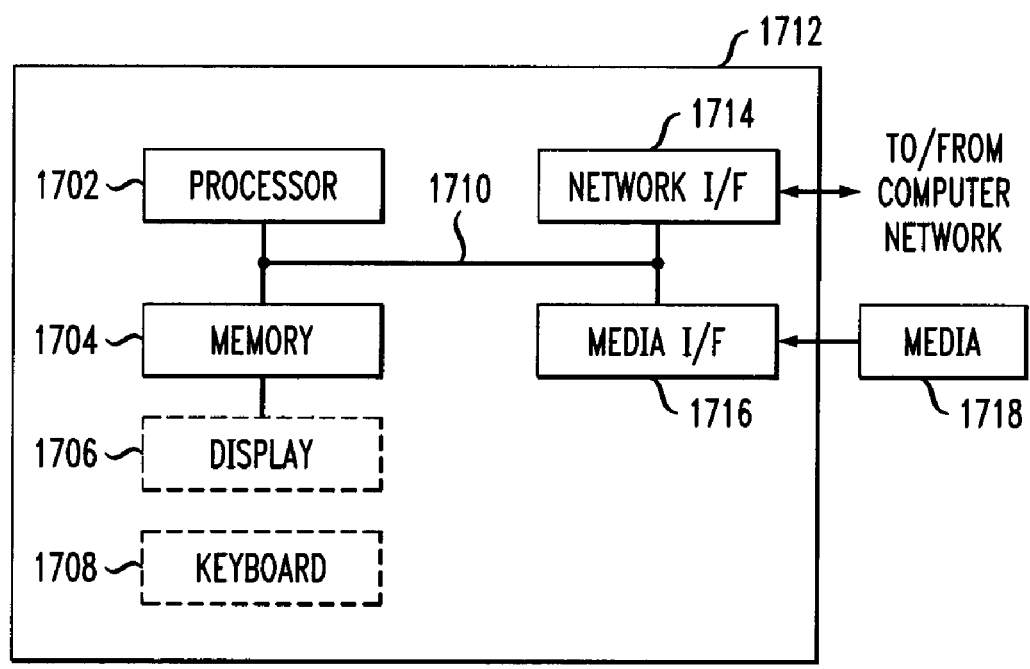
FIG. 7 depicts a computer system that may be useful in implementing one or more aspects and/or elements of the present invention.

One or more embodiments can make use of software running on a general purpose computer or workstation. With reference to FIG. 7, such an implementation might employ, for example, a processor 1702, a memory 1704, and an input/output interface formed, for example, by a display 1706 and a keyboard 1708. The term "processor" as used herein is intended to include any processing device, such as, for example, one that includes a CPU (central processing unit) and/or other forms of processing circuitry. Further, the term "processor" may refer to more than one individual processor. In connection with FIG. 7, the term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1702, memory 1704, and input/output interface such as display 1706 and keyboard 1708 can be interconnected, for example, via bus 1710 as part of a data processing unit 1712. Suitable interconnections, for example via bus 1710, can also be provided to a network interface 1714, such as a network card, which can be provided to interface with a computer network, and to a media interface 1716, such as a diskette or CD-ROM drive, which can be provided to interface with media 1718. FIG. 7 is illustrative of the servers and other computers mentioned herein.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device). Examples of a computer-readable medium include a semiconductor or solid-state memory (for example memory 1704), magnetic tape, a removable computer diskette (for example media 1718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1702 coupled directly or indirectly to memory elements 1704 through a system bus 1710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1708, displays 1706, pointing devices, and the like) can be coupled to the system either directly (such as via bus 1710) or through intervening I/O controllers (omitted for clarity).

Network adapters such as network interface 1714 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining a plurality of application profiles, for a plurality of applications, each of said profiles specifying a list of resources, and requirements for each of said resources, associated with a corresponding one of said applications;
   facilitating specification of a plurality of constraints associated with said applications;
   facilitating obtaining a plurality of cost models associated with at least two different kinds of servers on which said applications are to run;
   generating a recommended server configuration for running said applications, by formulating and solving a bin packing problem, wherein:
      each of said at least two different kinds of servers is treated as a bin of a different size, based on its capacity, and has an acquisition cost associated therewith, said size being substantially equal to a corresponding one of said resource requirement as given by a corresponding one of said application profiles;
      each of said applications is treated as an item, with an associated size, to be packed into said bins; and
      said bin packing problem develops said recommended server configuration based on reducing a total acquisition cost while satisfying said constraints and said sizes of said applications;
   measuring performance of said recommended server configuration, wherein said performance measurement comprises at least one of a total number of said servers turned off, a number of violations of said constraints per unit time, and a time required to generate said recommended configurations.

2. The method of claim 1, further comprising the additional step of configuring said applications and said servers in accordance with said recommended server configuration.

3. The method of claim 1, further comprising operating said applications and said servers in accordance with said recommended server configuration.

4. The method of claim 1, wherein said step of obtaining said plurality of application profiles comprises accessing data.

5. The method of claim 1, wherein said step of obtaining said plurality of application profiles comprises:
   obtaining monitored data from at least one pre-existing system on which said applications are already running;
   using said data from said at least one pre-existing system to build pre-existing system application profiles for said pre-existing system; and
   using said capacities of said servers to estimate said plurality of application profiles.

6. The method of claim 5, wherein said monitored data from said at least one pre-existing system comprises central processing unit utilization, network utilization, disk utilization, and memory utilization.

7. The method of claim 1, wherein said application profiles are obtained for a plurality of time periods, further comprising the additional step of repeating said generating step for additional ones of said time periods.

8. The method of claim 1, wherein said recommended server configuration comprises a first recommended server configuration, further comprising:
   repeating said generating step to generate at least a second recommended server configuration; and
   estimating run-time cost for said first and second recommended server configurations; and
   determining for which of said first and second recommended server configurations a total cost, comprising said acquisition cost and said run-time cost, is lower.

9. The method of claim 8, wherein said second recommended configuration is generated dynamically, and wherein said performance measurements further comprises a remapping interval associated with said dynamic generation.

10. The method of claim 8, wherein said determining comprises maximizing an objective function, B, given by:

$$B = \sum_{i=1}^{N}(Cost_i + \mathcal{F}(CPU_i)) - \sum_{j=1}^{N}\left(\begin{array}{c}Cost_j \times Y_j + \sum_{k=1}^{N}MCost_{k,j} \times \\ A_{k,j} + \mathcal{F}\left(\sum_{k=1}^{N}CPU_k \times A_{k,j}\right)\end{array}\right)$$

where:
N is the number of virtual machines,
$Cost_a$ is the fixed cost of running a server "a,"
$MCost_{b,c}$ is the cost of migrating virtual machine $VM_b$ to server $server_c$,
$\mathcal{F}(v)$ represents the power drawn by a server at a given utilization,
Y is used for bookkeeping to track of which of said servers are currently being used, and
A records which of said applications are assigned to which of said servers.

11. The method of claim 8, wherein at least one of said recommended server configurations is based, at least in part, on detection of at least one of said servers with low utilization.

12. The method of claim 8, wherein at least one of said recommended server configurations is based, at least in part, on detection of a condition where at least one of said servers has a time-varying load complementary to a time-varying load of at least another one of said servers.

13. The method of claim 8, wherein said second recommended server configuration is generated statically, for a second time, said second time being after a first time for which said first recommended server configuration is generated, said second recommendation being generated by taking into account cost and technology changes between said first and second times.

14. The method of claim 8, wherein said second recommended server configuration is generated dynamically, for a second time, said second time being after a first time for which said first recommended server configuration is generated, said second recommendation being generated by generating a plurality of snapshots between said first time and said second time, said snapshots taking into account time-varying changes in resource utilization.

15. A system comprising:
means for obtaining a plurality of application profiles, for a plurality of applications, each of said profiles specifying a list of resources, and requirements for each of said resources, associated with a corresponding one of said applications, wherein obtaining a plurality of application profiles is carried out by a module executing on a hardware processor;
means for facilitating specification of a plurality of constraints associated with said applications, wherein facilitating specification of a plurality of constraints is carried out by a module executing on a hardware processor;
means for facilitating obtaining a plurality of cost models associated with at least two different kinds of servers on which said applications are to run, wherein facilitating obtaining a plurality of cost models is carried out by a module executing on a hardware processor;
means for generating a recommended server configuration for running said applications, by formulating and solving a bin packing problem, wherein generating a recommended server configuration is carried out by a module executing on a hardware processor, and wherein:
each of said at least two different kinds of servers is treated as a bin of a different size, based on its capacity, and has an acquisition cost associated therewith, said size being substantially equal to a corresponding one of said resource requirement as given by a corresponding one of said application profiles;
each of said applications is treated as an item, with an associated size, to be packed into said bins; and
said bin packing problem develops said recommended server configuration based on reducing a total acquisition cost while satisfying said constraints and said sizes of said applications;
means for measuring performance of said recommended server configuration, wherein said performance measurement comprises at least one of a total number of said servers turned off, a number of violations of said constraints per unit time, and a time required to generate said recommended configurations, and wherein measuring performance is carried out by a module executing on a hardware processor.

16. The system of claim 15, further comprising means for facilitating configuring said applications and said servers in accordance with said recommended server configuration.

17. The system of claim 15, further comprising means for facilitating operating said applications and said servers in accordance with said recommended server configuration.

18. A computer program product comprising a tangible non-transitory computer useable recordable storage medium including computer usable program code, said computer program product including:
computer usable program code for obtaining a plurality of application profiles, for a plurality of applications, each of said profiles specifying a list of resources, and requirements for each of said resources, associated with a corresponding one of said applications;
computer usable program code for facilitating specification of a plurality of constraints associated with said applications;
computer usable program code for facilitating obtaining a plurality of cost models associated with at least two different kinds of servers on which said applications are to run;
computer usable program code for generating a recommended server configuration for running said applications, by formulating and solving a bin packing problem, wherein:
each of said at least two different kinds of servers is treated as a bin of a different size, based on its capacity, and has an acquisition cost associated therewith, said size being substantially equal to a corresponding one of said resource requirement as given by a corresponding one of said application profiles;
each of said applications is treated as an item, with an associated size, to be packed into said bins; and
said bin packing problem develops said recommended server configuration based on reducing a total acquisition cost while satisfying said constraints and said sizes of said applications; and
computer useable program code for measuring performance of said recommended server configuration, wherein said performance measurement comprises at least one of a total number of said servers turned off, a number of violations of said constraints per unit time, and a time required to generate said recommended configurations.

19. The computer program product of claim 18, further comprising computer usable program code for facilitating configuring said applications and said servers in accordance with said recommended server configuration.

20. The computer program product of claim 18, further comprising computer usable program code for facilitating operating said applications and said servers in accordance with said recommended server configuration.

21. A system comprising:

a memory; and at least one processor, coupled to said memory, and operative to:

obtain a plurality of application profiles, for a plurality of applications, each of said profiles specifying a list of resources, and requirements for each of said resources, associated with a corresponding one of said applications;

facilitate specification of a plurality of constraints associated with said applications;

facilitate obtaining a plurality of cost models associated with at least two different kinds of servers on which said applications are to run;

generate a recommended server configuration for miming said applications, by formulating and solving a bin packing problem, wherein:

each of said at least two different kinds of servers is treated as a bin of a different size, based on its capacity, and has an acquisition cost associated therewith, said size being substantially equal to a corresponding one of said resource requirement as given by a corresponding one of said application profiles;

each of said applications is treated as an item, with an associated size, to be packed into said bins; and said bin packing problem develops said recommended server configuration based on reducing a total acquisition cost while satisfying said constraints and said sizes of said applications; and measure performance of said recommended server configuration, wherein said performance measurement comprises at least one of a total number of said servers turned off, a number of violations of said constraints per unit time, and a time required to generate said recommended configurations.

22. The system of claim 21, wherein said processor is further operative to facilitate configuring said applications and said servers in accordance with said recommended server configuration.

23. The system of claim 21, wherein said processor is further operative to facilitate operating said applications and said servers in accordance with said recommended server configuration.

\* \* \* \* \*